Oct. 9, 1934.  E. E. EMONS  1,976,661

SPECTACLE FRONT

Filed Jan. 12, 1934

Inventor
Ernest E. Emons

By Geo. P. Kimmel
Attorney

Patented Oct. 9, 1934

1,976,661

UNITED STATES PATENT OFFICE 1,976,661

SPECTACLE FRONT

Ernest E. Emons, Kennett Square, Pa.

Application January 12, 1934, Serial No. 706,427

3 Claims. (Cl. 88—53)

This invention relates in general to spectacle frames, and more particularly has reference to the temple attachments therefor and to the novel and advantageous disposition of said attachments with respect to the remainder of the spectacle frame and their manner of connection thereto.

In the past, temples have been connected to the rims of spectacle frames substantially at their horizontal medians by means of horizontal projecting hinge members permanently connected to the lens rims. These horizontally projecting hinge members have also been utilized for the purpose of securing together a split portion of the lens rim in a well known manner.

More recently, it has been found desirable to place the temple connections for spectacle frames in a higher position so that they will lie outside of the normal useful field of side vision. These temple connections likewise have been secured to the lens rim at a point most nearly adjacent the desired position of the temple, and have like the previous constructions been utilized for the joint between the two ends of a split rim. Both of the constructions thus far set forth have, however, been positioned relatively close to their points of attachment to the lens rims and it has been difficult to secure proper adjustment of the endpiece connection with respect to the spectacle frame because of its short distance.

Various attempts have been made to overcome the difficulties of attaching the temple connection directly to the lens rim at the nearest point, these various attempts having included the elongation of the arm supporting the temple connection, and the securing of those arms to the lens rims at points more remote from the desired position of the temple. Some of these arms have been connected at the outer side edges of the rim and have extended in substantially the same planes as the rims themselves in an upward and outward direction to the position of the temple connection. Others have secured these elongated portions adjacent the upper edges of the lens rims and have extended them outwardly and downwardly to the position of the temple connection. The first of these expedients has proven to be impractical not only because it positions the temple connection improperly and does not form a strong and serviceable mounting, but also because its appearance due to the prominence of the position of the arms supporting the temple connection is not pleasing to the eye. The other attempt has not proven to be practical because of the fact that when the temple connection is mounted on an arm secured to the top of the lens rim at a point spaced materially from the temporal side of the lens there is a great strain placed upon this arm and it is extremely hard to keep it in adjustment.

It is therefore an object of this invention to mount a temple connection upon a supporting arm and to position said supporting arm and temple connection in such a manner that it will properly locate the temple connection and at the same time will be extremely inconspicuous when in position on the face of a wearer. It is a further object to so position and secure this arm that it shall not be subjected to unusual or extreme forces tending to distort it and so that it will be enabled to hold whatever adjustment may be given to it.

With the above and other objects in view, this invention is set forth by way of illustration in the embodiment illustrated in the accompanying drawing and described in the following specification.

Figure 1:
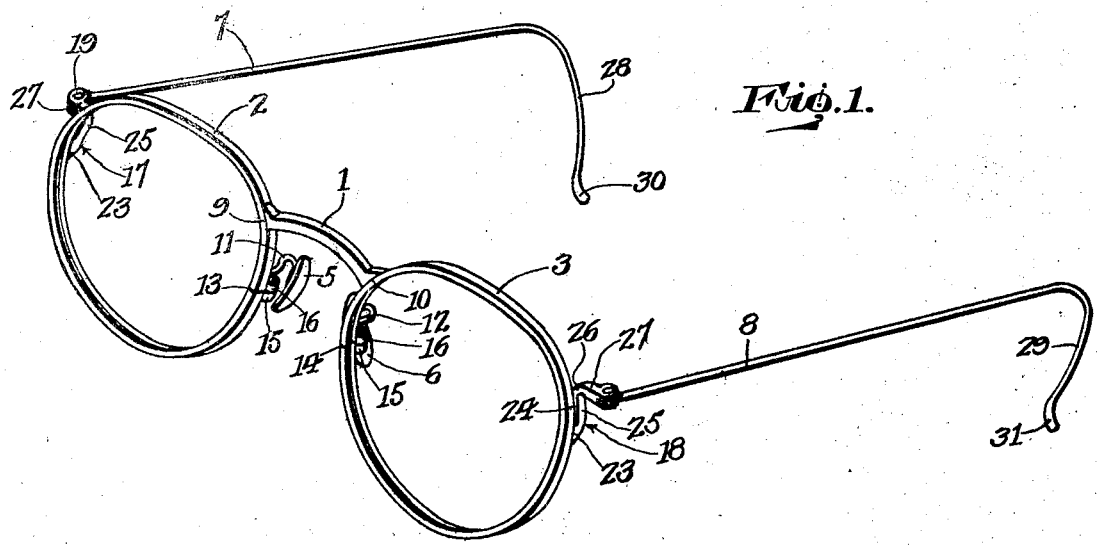
Figure 1 is a perspective view of a spectacle frame embodying this invention.

As illustrated in the drawing, the spectacle frame of this invention includes a bridge 1 of conventional design, a pair of lens rims 2 and 3 respectively, a pair of nose pads 5 and 6 for supporting the spectacle frame upon the nose of the wearer, and a pair of temples 7 and 8 for securing the spectacle frame to the wearer's ears. The bridge 1 is secured to the rims 2 and 3 respectively at 9 and 10 in any conventional manner such as by soldering or the like. The nose pads 5 and 6 are mounted upon the rims 2 and 3 below the ends 9 and 10 of the bridge 1, by means of supporting arms 11 and 12 provided for that purpose. These supporting arms are secured to the lens rims in any convenient manner such as by soldering, and are likewise secured to the nose pads in any desired well known manner.

In accordance with this invention, and for the purpose of leaving the temple edge of the lens rims continuous and devoid of any lateral projection, the lens rims are split not along their temple edges as is most conventional, but adjacent their nasal edges at 13 and 14 respectively. For the purpose of securing these split ends together there are provided a pair of complementary tubular portions 15 and 16 upon the rear surface of each rim adjacent the respective ends. One of these tubular portions may if desired be plain or otherwise formed to receive a securing member passing through the tubes to secure them together.

For the purpose of mounting the temples 7 and 8 at the outer or temple sides of the lens rims, there are provided a pair of elongated arms generally indicated at 17 and 18 respectively. Each of said arms includes an upper end part, a lower end part and an intermediate part. The said upper end part being disposed outwardly at right angles to said intermediate part. The said lower end part being disposed forwardly at right angles to said intermediate part. The said end parts arranged at right angles to each other. The upper end part being of greater length than said lower end part. The said upper end part having its outer end in the form of an enlarged bifurcated portion forming a temple hinge joint. This enlarged bifurcated portion provides an upper ear 19 and a lower ear 20 having a space 21 between them for the reception of the temples. Both of these ears are perforated as illustrated at 22 for the purpose of receiving a pivot pin or screw.

Figure 2:
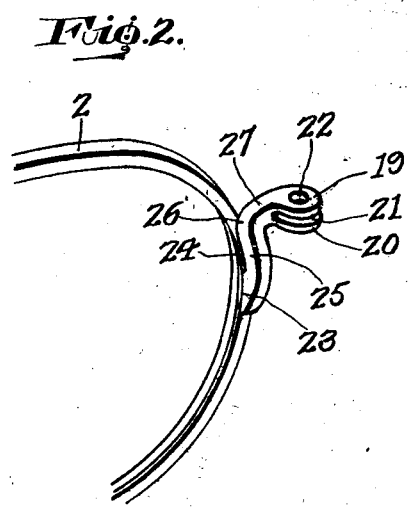
Figure 2 is an enlarged perspective of a portion of the frame illustrated in Figure 1, showing the details of the temple connection and its relation with respect to the lens rim.
Figure 3:
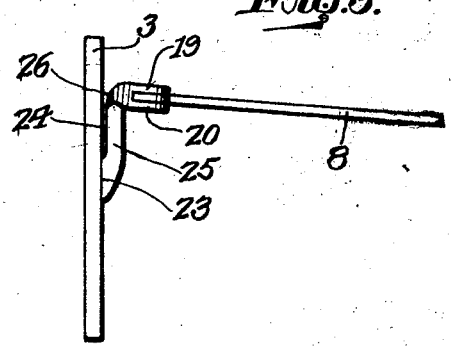
Figure 3 is a side elevation of the spectacle illustrated in Figure 1.

The free end of the lower end part of each of the arms 17 and 18 is fixedly secured against the rear face of the temple side of the respective lens rims directly behind and substantially at the horizontal center line of the frame. This position is indicated at 23 in Figures 2 and 3. The said lower end parts of said arms when secured to the rear face of the temple sides of the frame are stationary and permanently disposed on said sides. It is to be noted at this point that the thickness of the arms 17 and 18 and of the lens rims 2 and 3 are substantially equal. By thickness is meant that dimension which is at right angles to the direction of the wearer's vision. It will of course be appreciated that this thickness may be made less in the case of the arms, providing the proper degree of strength for the arms can be maintained with a smaller dimension. However, it should not be made greater in any substantial degree because it is contemplated that the major portion of each arm shall lie behind and be in a great measure concealed by the lens rims.

From the point 23 where a lower end part of an arm is attached to the rear face of the lens rim 2 or 3, the said lower end part extends rearwardly a very slight distance for the intermediate part of the arm to clear the rear face of the lens rim as indicated at 24. The intermediate part of each arm, indicated at 25 extends upwardly in a direction substantially parallel to the plane of the lens rim and is permanently disposed directly behind and in alignment with the rear face of the temple side of a rim, to a point 26 located above the normal field of useful side vision. At this point 26, the intermediate part 25 merges into the inner end of the upper end part of an arm. The upper end part of an arm is designated 27, is disposed horizontally, extends outwardly with respect to a temple side of the rim and terminates in the temple hinge connection previously described. It is noted that the reference to an upward and to a horizontal direction in the description and claims has reference to the direction of the various parts when the spectacle frame is in normal position on the face of a wearer.

The temples 7 and 8 may be of any desired form, the particular ones disclosed being bent at 28 and 29 adjacent their rearmost ends for engagement with the ears of a wearer. The extreme ends 30 and 31 of these temples are reversely bent for the purpose of preventing injury or discomfort caused by these end portions of the temples prodding the wearer's ears.

Figure 4:
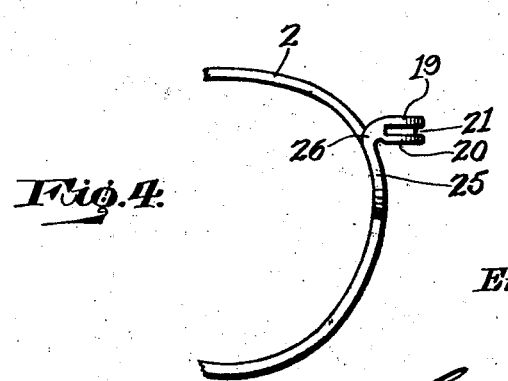
Figure 4 is a view similar to Figure 2 but showing a rear elevation.

It will be seen from the above that a spectacle frame has been provided in which a temple connection is supported in such a manner as to be readily adjustable within a comparatively wide range while at the same time it is so secured to the lens rim that it is inconspicuous in the extreme and yet strong and durable and capable of maintaining its proper adjustment. The temple side of the lens frame has been left entirely free from any other projection than the temple support itself, and this projection has been so arranged that it is least noticeable and will interfere in the least possible manner with the wearing of the spectacle. As will be noted in Figure 4, the major portion of the supporting arm lies directly behind the lens rim and a front view of the spectacle frame will give the appearance of a relatively short and inconspicuous temple support secured to the lens rim at the nearest point to the temple. Neither the portion 25 of the arm nor the part 23 where it is attached to the rear face of the lens rim will be apparent when viewing the spectacle directly from the front. Furthermore, no other projection of any sort will appear on the temple side of this lens rim to detract from or form a conspicuous part of the spectacle frame.

It will be understood that the foregoing is by way of illustration and example only and is not to be taken as a limitation upon the scope of this invention. This invention is to be limited in its scope only by the prior art and by the terms of the appended claims.

What I claim is:—

1. In an ophthalmic mounting, a pair of lens rims having their temple sides continuous and devoid of lateral projections, an upstanding stationary arm having its lower end fixedly secured to the rear face of the temple side of each lens rim substantially on the horizontal median of the lens rim, said arm having the lower part thereof extending slightly to the rear from its fixed lower end to provide for its remaining portion to clear the lens rim, said arm having a part thereof extended upwardly from said lower part to a point above the normal field of useful side vision, said upstanding part being permanently disposed directly behind the rear face of the temple side of the lens rim and terminating at its upper end in a horizontal part extending in a temporal direction, said arm having a temple hinge joint at the free or upper end thereof, and a temple hinged to each hinge joint, said arms, with the exception of said horizontally extending parts thereof being permanently concealed from the front of the mounting by the rear faces of the temple sides of the rims.

2. In an ophthalmic mounting, a pair of lens rims, an upstanding arm of substantially the same thickness as said lens rims having its lower end edge fixedly secured directly to the rear face of each lens rim substantially on the horizontal median of the lens rim at the temple side thereof, said arm having the lower part thereof extending slightly to the rear from its fixed lower end edge to provide for its remaining portion to clear the lens rim, said arm having a part thereof extending upwardly from said lower part substantially parallel to the plane of the lens rim to a point above the normal field of useful side vision, said upstanding part being permanently disposed directly behind the rear face of the temple side of the lens rim and terminating at its upper end in a horizontal part extending in a temporal direction, said arm having a temple hinge joint at the free or upper end thereof, and a temple hinged to each hinge joint, said arms, with the exception of said horizontally extending parts, lying in close relation with respect to and permanently completely concealed from the front of the mounting by the rear faces of the temple sides of the lens rims.

3. In an ophthalmic mounting, a temple connecting end piece for the temple side of a lens rim, said end piece consisting of an arm formed of a lower end part, an intermediate and an upper end part, said end parts being disposed at right angles to said intermediate part, said end parts being disposed at right angles to each other, said upper end part being of greater length than said lower end part, said lower end part adapted to have its free end edge fixedly secured directly against the rear face of the temple side of the lens rim and extend rearwardly from the latter, said intermediate end part corresponding in contour to a portion of the temple side of the lens rim, said lower end part when secured to the rear face of the temple side of the lens rim concealed by the latter from the front of the rim and disposing said intermediate part permanently in parallel spaced close relation to the rear face of the temple side of the lens rim to be concealed by the latter from the front of the rim, said upper end part being disposed horizontally and extending in a direction towards the temple, and said upper end part having its outer end formed with a hinge connection for the temple.

ERNEST E. EMONS.